(12) United States Patent
Greco et al.

(10) Patent No.: US 6,950,257 B1
(45) Date of Patent: Sep. 27, 2005

(54) WRITING TO MAGNETIC TAPE WITH BACKHITCHLESS BACKSPACING AND DATA SET INVALIDATION

(75) Inventors: Paul Merrill Greco, Tucson, AZ (US); Glen Alan Jaquette, Tucson, AZ (US); Hiroshi Itagaki, Yokohama (JP); Hironobu Nagura, Kawasaki (JP); Hirokazu Nakayama, Fujisawa (JP); Satoshi Tohji, Kanagawa (JP); Terue Watanabe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/836,671

(22) Filed: Apr. 29, 2004

(51) Int. Cl.[7] .................................................. G11B 5/09
(52) U.S. Cl. ............................. 360/48; 360/53; 710/6
(58) Field of Search ............................... 360/8, 48, 31, 360/53, 73.04; 711/113, 202; 710/5, 6, 52–53

(56) References Cited

U.S. PATENT DOCUMENTS

| | | | | |
|---|---|---|---|---|
| 4,410,942 A | | 10/1983 | Milligan et al. | 364/200 |
| 4,435,762 A | * | 3/1984 | Milligan et al. | 710/6 |
| 4,534,013 A | | 8/1985 | Sheth | 364/900 |
| 4,675,807 A | | 6/1987 | Gourneau et al. | 364/200 |
| 4,982,390 A | | 1/1991 | Tanaka | 369/30 |
| 5,200,864 A | | 4/1993 | Dunn et al. | 360/48 |
| 5,274,772 A | | 12/1993 | Dunn et al. | 395/275 |
| 5,335,328 A | | 8/1994 | Dunn et al. | 395/275 |
| 5,341,378 A | | 8/1994 | Shih | 371/2.2 |
| 5,384,669 A | | 1/1995 | Dunn et al. | 360/48 |
| 5,485,321 A | | 1/1996 | Leonhardt et al. | 360/48 |
| 5,572,378 A | | 11/1996 | Schwarz et al. | 360/48 |
| 5,715,104 A | | 2/1998 | Takada et al. | 360/15 |
| 6,016,233 A | | 1/2000 | Scholz et al. | 360/15 |
| 6,147,823 A | | 11/2000 | Matsumi et al. | 360/8 |
| 6,154,334 A | | 11/2000 | Pine | 360/74.1 |
| 6,239,939 B1 | * | 5/2001 | Bui et al. | 360/77.12 |
| 6,532,128 B1 | * | 3/2003 | Bui et al. | 360/74.1 |
| 6,856,479 B2 | * | 2/2005 | Jaquette et al. | 360/48 |
| 6,865,043 B2 | * | 3/2005 | Ataku et al. | 360/48 |

FOREIGN PATENT DOCUMENTS

WO    00/23992    4/2000    ........... G11B 15/18

OTHER PUBLICATIONS

"Storage REC", IBM Technical Disclosure Bulletin, Nov. 1982, p. 2880.

* cited by examiner

*Primary Examiner*—David Hudspeth
*Assistant Examiner*—Dismery Mercedes
(74) *Attorney, Agent, or Firm*—John H. Holcombe

(57) ABSTRACT

Backspacing over data to overwrite the data as recorded on magnetic tape is provided logically, rather than by causing a magnetic tape to drive to backhitch. The data is written to the magnetic tape as it was before it was logically changed in order to insure that the data is preserved on tape. Recovery of the data is from a succeeding data set which logically invalidates the original data by a superseding identifier. Control logic arranges data transactions for writing to magnetic tape as data sets; and, in response to backspace and overwrite commands, or when transactions are accumulated into a succeeding data set, rewrites the original transaction adjusted in accordance with the commands as a superseding data set downstream from the original transaction, logically invalidating the original transaction by setting a superseding identifier in the superseding data set(s).

39 Claims, 8 Drawing Sheets

| DS | A | B | C1 | C2 | D | E1 | E2 | F | C1R | E1R | FR |
|---|---|---|---|---|---|---|---|---|---|---|---|
| DS# | N | N+1 | N+2 | N+3 | N+4 | N+6 | N+7 | N+8 | N | N+1 | N+2 |
| WP# | W | W | W | W | W | W | W | W | W+1 | W+1 | W+1 |
| SI | N | Y | Y | N | Y | Y | N | Y | N | N | N |

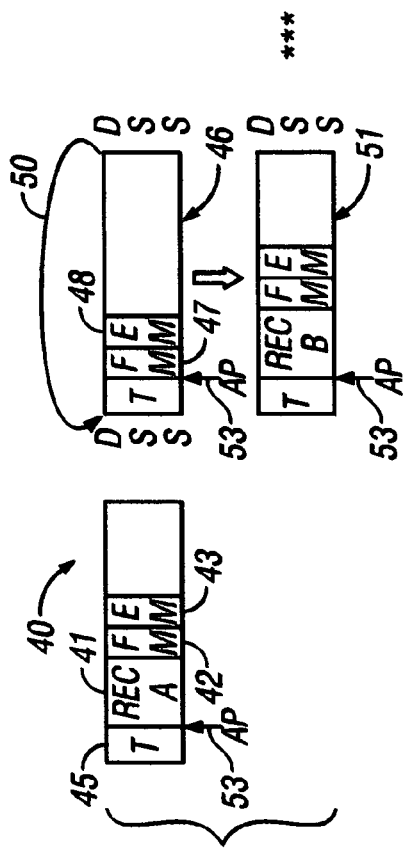
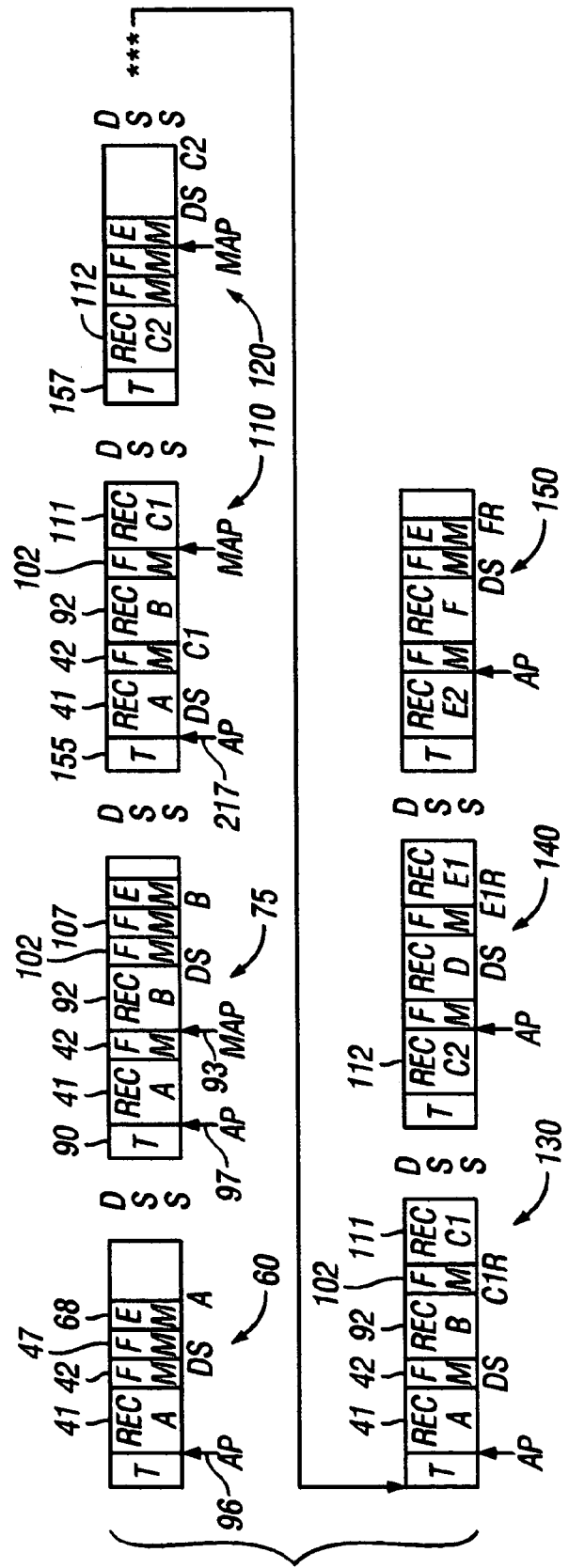
FIG. 2
(Prior Art)
FIG. 3

FIG. 5

| DS | A | B | C1 | C2 | D | E1 | E2 | F | C1R | E1R | FR |
|---|---|---|---|---|---|---|---|---|---|---|---|
| DS# | N | N+1 | N+2 | N+3 | N+4 | N+6 | N+7 | N+8 | N | N+1 | N+2 |
| W/P# | W | W | W | W | W | W | W | W | W+1 | W+1 | W+1 |
| SI | N | Y | Y | N | Y | Y | N | Y | N | N | N |

FIG. 6

| DS | A | B | C1 | C2 | D | E1 | E2 | F | C1R | E1R | FR |
|---|---|---|---|---|---|---|---|---|---|---|---|
| DS# | N | N+1 | N+2 | N+3 | N+4 | N+6 | N+7 | N+8 | N | N+1 | N+2 |
| W/P# | W | W | W | W | W | W | W | W | W+1 | W+1 | W+1 |
| DS#sw | N | N | N | N+1 | N+1 | N+1 | N+2 | N+2 | N | N+1 | N+2 |

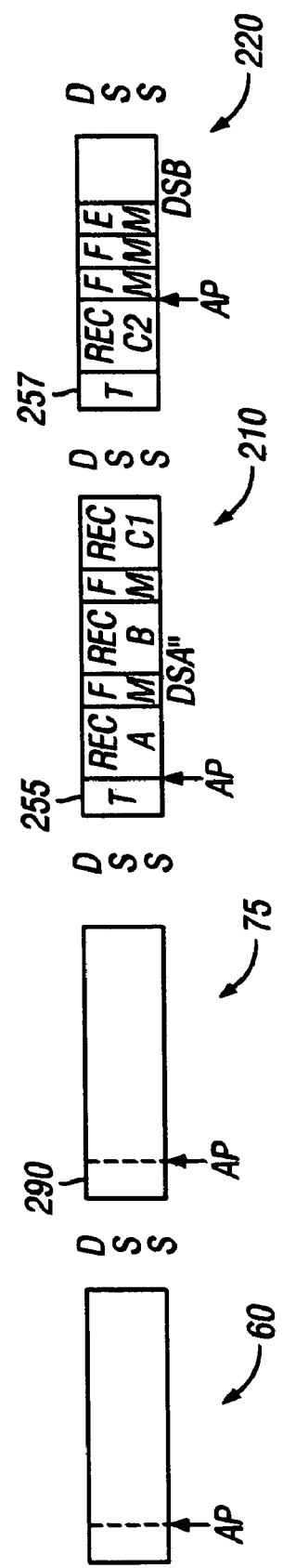

WRITING TO MAGNETIC TAPE WITH BACKHITCHLESS BACKSPACING AND DATA SET INVALIDATION

FIELD OF THE INVENTION

This invention relates to storage of data to magnetic tape, and, more particularly, to storing data that may be subject to commands to backspace and overwrite at least a portion of the data or where a data set may be changed subsequent to initial generation.

BACKGROUND OF THE INVENTION

Data may be provided to tape drives in the form of transactions, and often a sequence of transactions. Commands may follow data transactions that comprise backspace (a.k.a. "space back") commands which logically position the drive further back in data so that if data is then written, it partially or wholly overwrites a previous transaction, known as an overwrite append. One example of backspacing and then overwrite appending is an ANSI standard write method that is used to guarantee that even if the host stops writing files (e.g. the connection is lost), the last written file is followed by two filemarks instead of one, the two filemarks identifying the location of the end of the last written file. The write method loops between three operations: 1) write some amount of data which will constitute a file, 2) write two filemarks, and 3) backspace one filemark. Each file is followed by one filemark and the last written file is followed by two filemarks. In other applications, a backspace command may also be employed to cause a subsequent write operation to overwrite some amount of data. A backspace command requires the magnetic tape drive to backhitch to delete or overwrite previously written material, such as the second of the two filemarks.

Magnetic tape drives may be optimized for continuous streaming, instead of stop and start operations. Backhitching during write is a function in which a magnetic tape drive typically stops forward motion of a magnetic tape, reverses the motion of the magnetic tape to position the magnetic tape behind the position at which a backspace command directs, and stops the reverse motion of the magnetic tape, and, in response to a write command, accelerates the magnetic tape to writing speed so as to be able to begin writing or overwriting at the correct point. The backhitch function takes time to accomplish and thereby reduces the performance of the magnetic tape drive as compared to streaming.

It may be possible to organize the data in a buffer in such a way that the backspace and overwrite append are provided logically. For example, the backspace and overwrite append commands may be utilized to ignore the data that has been backspaced over when reading out of the buffer. However, if the data is to be preserved on magnetic tape to insure against loss in the event of an error, such as loss of power to the buffer, this approach alone would not meet the requirements of truly preserving the data.

SUMMARY OF THE INVENTION

The present invention comprises a recording system control, a magnetic tape drive, and a method for writing to magnetic tape.

In the present invention, the data is organized in a buffer in such a way that the backspace is provided logically. In addition, the data is written to the magnetic tape as it was before it was logically changed in order to insure that the data is preserved on tape. Thus, if recovery of the data is required, for example, for recovery in the case of loss of power to the buffer, the data is available as recorded in the original form, and is logically invalidated when the changed data is recorded on magnetic tape.

In one embodiment, a recording system control comprises at least one buffer for storing data to be written to magnetic tape; and control logic operating the buffer(s) and at least one recording channel of a magnetic tape drive. The control logic writes data from the buffer(s) to magnetic tape in response to received commands. The control logic arranges data stored in the buffer(s) in the form of transactions, into at least one data set for writing to magnetic tape; and if a backspace command is received to backspace to a point of a first transaction, and is followed by a command for overwriting at least a part of the first transaction, the control logic rewrites the first transaction adjusted in accordance with the backspace and overwrite commands to magnetic tape as at least one superseding data set downstream from preceding data set(s) having the first transaction, and logically invalidates at least one part of the preceding data set(s) by setting a superseding identifier in the superseding data set(s).

The superseding identifier, in one embodiment comprises a data set identifier selectively arranged to indicate that the superseding data set logically invalidates the preceding data set.

In another embodiment, the superseding identifier comprises a write pass identifier incremented with respect to the preceding data set(s) together with a selectively adjusted data set identifier.

In a further embodiment, the superseding identifier comprises an identifier together with an indication that the superseding data set comprises the one transaction.

In still another embodiment, the superseding identifier comprises an identifier together with a repetition of at least part of the one transaction as the superseding data set.

In a further embodiment, when reading, e.g. for recovery of transactions, control logic additionally reads transactions by reading downstream of a present data set to determine whether a succeeding data set comprises the superseding identifier with respect to the present data set. If the superseding identifier is determined to be comprised in the succeeding data set, the control logic logically denotes the logically invalidated (part of) present data set and reads the succeeding data set.

Thus, as discussed above, the data sets that contain transactions that are subject to a backspace command to a point of a first transaction, followed by a command for overwriting at least a part of the first transaction, are logically deleted by a superseding identifier in a succeeding data set. Additionally, a data set that is written to magnetic tape, but whose transactions are accumulated with subsequent transactions in a succeeding data set, with or without overwriting, may also be logically deleted by a superseding identifier in the succeeding data set.

In another embodiment, control logic arranges data stored in the buffer(s) in the form of transactions, into at least one preceding data set for writing to magnetic tape; and if at least one first transaction arranged to be written to magnetic tape comprises less than an entire preceding data set and is followed by another transaction associated with the first transaction, the control logic accumulates the first transaction(s) with the another transaction and writes the accumulated transaction to magnetic tape as at least one superseding data set downstream from the preceding data set(s), logically invalidating at least one part of the preceding data set(s) by setting a superseding identifier in the superseding data set. To read the data sets, the control logic reads downstream of a present data set to determine whether a succeeding data set comprises the superseding identifier with respect to the present data set, and, if the superseding identifier is determined to be comprised in the succeeding data set, logically denotes the logically invalidated (part of) present data set and reads the succeeding data set.

The superseding identifier, in one embodiment, comprises a data set identifier selectively arranged to indicate supersedence with respect to the preceding data set(s).

In another embodiment, the superseding identifier comprises a write pass identifier incremented with respect to the preceding data set(s) together with a selectively adjusted data set identifier.

Other situations may arise where data is to be initially preserved, but subsequently found to be undesireable. In a still further embodiment, the control logic writes data from the buffer to magnetic tape in the form of data sets; and, in response to a trigger, writes at least one succeeding data set downstream from at least one preceding data set, and logically invalidates at least a part of the preceding data set(s) by setting a superseding identifier in the succeeding data set(s).

For a fuller understanding of the present invention, reference should be made to the following detailed description taken in conjunction with the accompanying drawings.

BRIEF DESCRIPTION OF THE DRAWINGS

FIG. 2 is a diagrammatic illustration of data transactions in the form of data sets written on a magnetic tape employing a prior art methodology with backhitching;

FIG. 3 is a diagrammatic illustration of data transactions in the form of data sets written on magnetic tape having a plurality of wraps, and employing accumulating backhitchless wraps for storing a work copy, and recursively rewriting the data transactions on standard wraps in accordance with an embodiment of the present invention;

FIG. 5 is a diagrammatic illustration of data set identifiers, write pass identifiers, and superseding identifiers for the data sets of FIG. 3;

FIG. 6 is a diagrammatic illustration of data set identifiers, write pass identifiers, and standard wrap data set identifiers for the data sets of FIG. 3;

FIG. 9 is a diagrammatic illustration of data set identifiers and write pass identifiers for the data sets of FIG. 8;

FIG. 10 is a diagrammatic illustration of some work copy data sets of FIG. 8 as read, some of which are logically invalidated;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
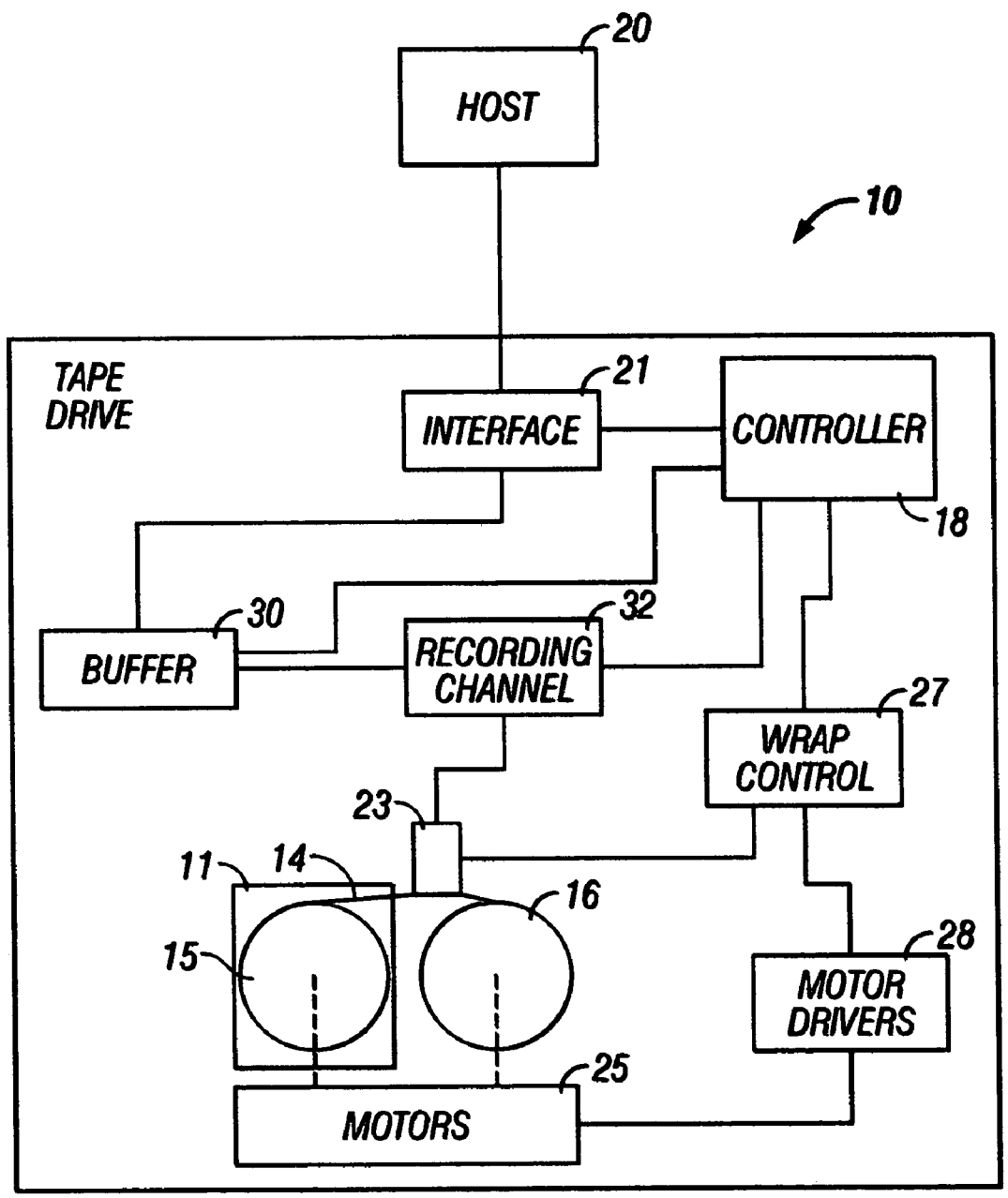
FIG. 1 is a block diagram of a magnetic tape drive with a magnetic tape cartridge which tape drive may implement the present invention.

Referring to FIG. 1, a tape drive 10 is illustrated which may implement aspects of the present invention. The tape drive provides a means for reading and writing information with respect to a magnetic tape cartridge 11. A cartridge and associated tape drive are illustrated, such as those adhering to the Linear Tape Open (LTO) format. An example of a single reel tape drive is the IBM 3580 Ultrium magnetic tape drive based on LTO technology. A further example of a single reel tape drive and cartridge is such as that discussed in U.S. Pat. No. 5,432,652, Comeaux et al., issued Jul. 11, 1995. Another example of a single reel tape drive is the IBM 3592 TotalStorage Enterprise magnetic tape drive and associated magnetic tape cartridge. An example of a dual reel cartridge is the IBM 3570 magnetic tape cartridge and associated drive.

As is understood by those of skill in the art, a magnetic tape cartridge 11 comprises a length of magnetic tape 14 wound on one or two reels 15, 16. Also as is understood by those of skill in the art, a tape drive 10 comprises one or more controllers 18 of a recording system for operating the tape drive in accordance with commands received from a host system 20 received at an interface 21. The tape drive may comprise a standalone unit or comprise a part of a tape library or other subsystem. The tape drive 10 may be coupled to the host system 20 directly, through a library, or over a network, and employ the Small Computer Systems Interface (SCSI), Fibre Channel interface, etc.

The magnetic tape cartridge 11 may be inserted in the tape drive 10, and loaded by the tape drive so that one or more read and/or write heads 23 of the recording system reads and/or writes information with respect to the magnetic tape 14 as the tape is moved longitudinally by one or more motors 25. The magnetic tape comprises a plurality of parallel tracks, or groups of tracks. In some formats, such as the LTO format, above, the tracks are arranged in a serpentine back and forth pattern of separate wraps, as is known to those of skill in the art. Also as known to those of skill in the art, the recording system comprises a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a recording channel 32, as is known to those of skill in the art.

Magnetic tape provides a means for physically storing data which may be archived or which may be stored in storage shelves of automated data storage libraries and accessed when required. Tape drives often employ a "read after write" process to insure that the data is written correctly to provide an aspect of permanence. This permanence allows copies of the data stored in memory or disk at the host system 20 to be erased, once that it knows a correct copy exists on magnetic tape, for example, by means of a command complete being returned to a synchronizing command.

Referring to FIG. 2, the data may be provided in the form of transactions, and often a sequence of transactions. Commands may follow data transactions that comprise backspace commands followed by write commands in which further write data is to write append over part or all of a previous transaction. Herein, such commands are called "backspace and overwrite" commands, and refer to a command to backspace to a point of a first transaction, followed by a command for overwriting at least a part of the first transaction. Not all backspace commands are followed by an "overwrite" command. For example, a read command may follow. One example is of backspace and overwrite commands an ANSI standard write method that is used to guarantee that even if the host stops writing files (e.g. the connection is lost), the last written file is followed by two filemarks instead of one, the two filemarks identifying the location of the end of the last written file. The write method loops between three operations: 1) write some amount of data which will constitute a file, 2) write two filemarks, and 3) backspace one filemark. Each file is followed by one filemark and the last written file is followed by two filemarks. In other applications, a backspace command may also be employed to overwrite some amount of data.

In one example of the prior art, the one or more data sets 40 are written with the data file 41, followed by one filemark 42 and an end marker 43. An end marker is a codeword which instructs decompression to stop when reading the compressed data. The data set will also have a table 45 which comprises information about the data set, and is not compressed. The information may comprise any suitable form, such as a header, and herein is referred to as a data set table. A second data set 46 is written with the second filemark 47 and end marker 48. The data sets are typically not immediately adjacent in tape, but are separated by "data set separator" (DSS) signals, as is known to those of skill in the art.

In response to a backspace command, the magnetic tape drive conducts a backhitch operation 50, comprising stopping forward motion of a magnetic tape, reversing the motion of the magnetic tape to position the magnetic tape behind the position at which a backspace command directs, and stopping the reverse motion of the magnetic tape, and, in response to a write command, accelerates the magnetic tape to writing speed so as to be able to begin overwriting the data set 46 with a new data set 51 at the correct point, thereby deleting the second filemark 47. The data set separator signals (DSS) provide an area in which the overwriting may be safely begun without having an impact on the preceding data set 40. In each instance, an access point 53 is positioned at the beginning of the data set, or at the end of any data entity (e.g. Record) which spans into that data set. An access point is a means under the LTO format for designating the beginning of a current data record or data records and where decompression can begin.

In the present invention, the data is organized in a buffer in such a way that the backspace is provided logically. In addition, the data is written to the magnetic tape as it was before it was logically changed in order to insure that the data is preserved on tape. Thus, if recovery of the data is required, for example, for recovery in the case of loss of power to the buffer, the data is available as recorded in the original transaction form, and is logically invalidated when the changed data is recorded on magnetic tape.

Copending and coassigned U.S. patent application Ser. No. 10/058,101 discusses a way of avoiding backhitches in the case of synchronized data, recording the data in a form limiting the gaps between data sets. Synchronized data comprises data that is to be physically written to tape before a command complete can be made, so that the host can erase its data, knowing that a copy physically exists on tape. The data in the form of transactions are preserved on magnetic tape with gaps between the transactions and a command complete is issued. The data is accumulated in a buffer, and then the accumulated data is recursively written to the tape in a sequence. In one embodiment, where the magnetic tape comprises a number of parallel tracks, work copies of the accumulated data are stored on some of the parallel tracks as accumulated backhitchless (AB) work copies, also known as accumulated backhitchless flush (ABF) copies.

Referring to FIG. 3, in one embodiment, control logic of recording system control 18 of FIG. 1 writes data from the buffer(s) 30 to magnetic tape 14 in response to commands received at interface(s) 21 of the magnetic tape drive 10. The control logic arranges data stored in the buffer(s) in the form of transactions, into at least one data set 60 of FIG. 3 for writing to magnetic tape. The data set(s) 60 comprises the original data set(s) and is also called the "preceding" data set(s) herein. The data set(s) 60 comprises the data file 41 of the original transaction, also called the "first" transaction herein, the first filemark 42 and the second filemark 47, as discussed above, and is followed by an end marker 68.

If a backspace command is received at the interface to backspace to a point of at least one "first" transaction, making the first transaction a candidate for being overwritten, the control logic writes the transaction to magnetic tape as at least one part of at least one data set 60, for example, as a work copy of the copending '101 application, on accumulated backhitchless flush (ABF) tracks, to preserve the transaction. If no ABF tracks are provided, the data set may be written on the main tracks and later recursively overwritten when a string of transactions are completed as work copies. This preserves the original transaction, also called the first transaction. If a write command is received that will overwrite at least a part of the first transaction, the control logic then organizes the data in the buffer to logically accommodate the backspace and overwrite commands and rewrites the first transaction adjusted in accordance with the backspace and overwrite commands to magnetic tape as at least one superseding data set 75 downstream from the preceding data set(s) 60, and logically invalidates at least one part of the preceding data set(s) 60 by setting a superseding identifier in the superseding data set(s) 75.

The superseding identifier may comprise any or a combination of identifiers.

Figure 4:
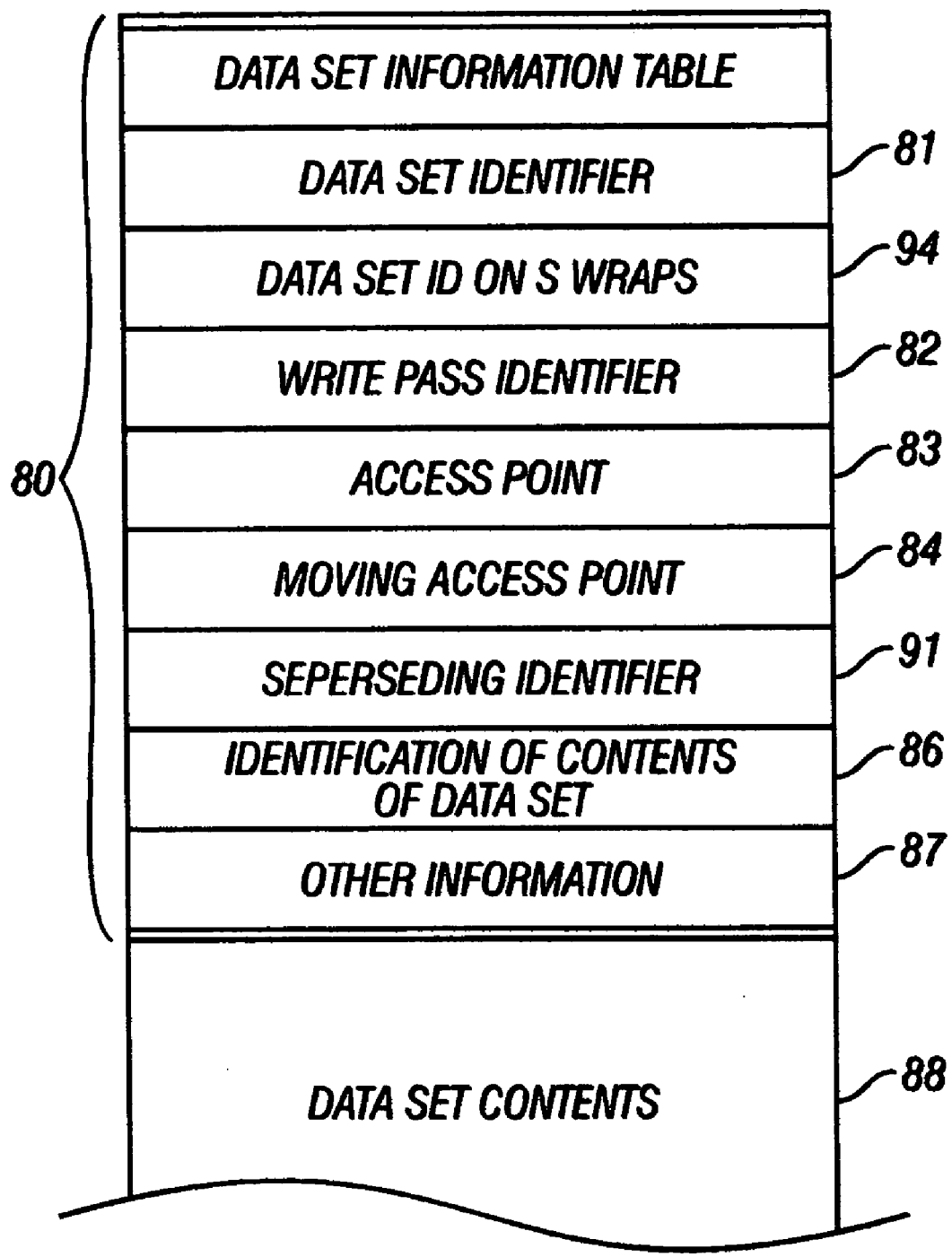
FIG. 4 is a diagrammatic illustration of a data set information table for data sets.

FIG. 4 illustrates an example of a data set information table 80 which, like the table 45 of FIG. 2, provides information regarding the associated data set, as is known to those of skill in the art, and may appear as a header, etc. The data set information table 80 of FIG. 4 may comprise a data set identifier 81 which identifies the data set, for example, by a number.

A write pass identifier 82 relates to the activity when the data set was written, as is known to those of skill in the art. For example, a string of data sets may be written in a single pass of the magnetic tape past a write head, and thus the data sets would all have the same write pass identifier, which may comprise a number. If other data sets are subsequently written in the same operation, but in a different pass (e.g. after a wrap turn), the write pass identifier might be incremented. The write pass may also be incremented as a part of overwrite append operations, as will be discussed.

An access point 83 may be specified in the data set table 80. An access point, such as access point 53 of FIG. 2, typically indicates the beginning of the data file or record of the data set, and indicates the point at which the data compression begins anew, so that it also serves as a position where decompression can begin, as is known to those of skill in the art. In the copending '101 application, a moving access point 84 is providing exactly at the end of the Valid Data Length of the preceding data set. This indicates the beginning of the next transaction, etc., in the succeeding data set.

The data set table 80 of FIG. 4 may also comprise a table of contents 86 or similar identification of the transaction (e.g. total record count, total filemark count, etc.) comprising the data set, and typically will comprise other information 87 about the data set and its contents 88.

The superseding identifier in the superseding data set(s) 75 of FIG. 3 may comprise a combination of information about the data set, for example, in the data set table 90 of the data set 75, or may comprise a special identifier, such as superseding identifier 91 of the data set table 80 of FIG. 4. For example, the data set table may comprise some reserved areas which may be employed for special purposes. The superseding identifier may be able to be set to either an on or off condition, and, if set on, will identify what is being superseded, such as a previous data set or part of a data set, such as a transaction. In this embodiment, the superseding identifier comprises an identifier 91 with an indication that the superseding data set comprises the first transaction(s) that is logically invalidated.

Alternatively, the superseding identifier may comprise an identifier 91 that is set on or off, designating that the immediately preceding data set or part of the data set is to be logically deleted, and, if the identification of contents 86 identifies specific content of the data set, it is compared to the identification of contents of the immediately preceding data set, and any repeated or overwritten content is logically deleted, or the entire preceding data set is logically deleted. In this example, the superseding identifier comprises an identifier together with an indication that the superseding data set comprises the first transaction(s) that is logically invalidated. Still alternatively, the superseding identifier comprises an identifier 91 in the same data set with a repetition of at least part of the first transaction(s) as the superseding data set, and the repetition indicates that the repeated part of the first transaction(s) in the one data set is superseded and is logically invalidated, or that the entire data set is superseded and is logically invalidated. For example, referring to FIG. 3, file 41 and first filemark 42 from data set 60 are repeated in data set 75, and the second filemark 47 is overwritten by a next file 92.

As another example, to avoid use of an otherwise reserved area of the data set table, such as table 80 of FIG. 4, other elements of the data set table may be employed to provide the superseding identifier. A separate data set identifier for the standard wraps 94 may be provided, for example, to provide an alternate identification which may be different than that of the ABF wraps. The data set identifier 94 may be selectively arranged to comprise the superseding identifier. The superseding identifier, in one embodiment, comprises a data set identifier 81 of the succeeding data set which is incremented or adjusted with respect to the preceding data set(s), together a data set identifier (sw) 94 which is selectively incremented or adjusted.

In another embodiment, referring to FIG. 4, the superseding identifier comprises a write pass identifier 82 of the table 80 that is incremented with respect to the preceding data set(s), together with a data set identifier 81 that is selectively incremented or adjusted.

In the event recovery is required before the changed data set can be written in the desired position on the magnetic tape, such as on the standard wraps, the control logic, as illustrated in FIG. 3 additionally reads transactions by reading downstream of a present data set 60 to determine whether a succeeding data set 75 comprises the superseding identifier with respect to the present data set, e.g. in data set information table 90 of data set 75. For example, the succeeding data set is previewed without decompressing any data of the data set. If the superseding identifier, as discussed above, is determined to comprise the succeeding data set, the control logic logically denotes the logically invalidated (part of) present data set and reads the succeeding data set, which, in this instance, also comprises the superseding data set. For example, the data set 75 has overwritten the second filemark 47 of data set 60 with a new transaction comprising file 92. Since the superseding identifier has been set in data set 75, indicating that the data set 60 is logically invalidated, the control logic logically deletes and does not decompress the contents of data set 60, as otherwise would occur at the access point 96. Instead, the content of the succeeding data set 75 is decompressed beginning at access point 97, established as the result of the logical invalidation of data set 60. Note that in this case, the access point is not moved to what would be moving access point 93, as with "standard" ABF writing, because decompression must include all the data which was to be decompressed from the preceding data set 60.

The ABF writing in accordance with the present invention may be differentiated from "standard" ABF writing, e.g. for the purpose of data recovery, by means of a version number, for example, comprising other information 87 of FIG. 4.

Still referring to FIG. 3, in an accumulation embodiment, such as illustrated in the copending '101 application, the control logic arranges data stored in the buffer(s) in the form of transactions, into at least one data set, e.g. data set 60, for writing to magnetic tape; and if at least one first transaction arranged to be written to magnetic tape, e.g. transaction file 41, comprises less than an entire data set and is followed by another transaction, e.g. transaction file 92, associated with the first transaction, the control logic accumulates the one first transaction(s) with the another transaction and writes the accumulated transaction to magnetic tape as at least one superseding data set, e.g. data set 75 downstream from the one data set(s) 60.

In accordance with the present invention, the control logic logically invalidates at least one part of the one data set(s) 60 by setting a superseding identifier in the superseding data set 75. To read the data sets, the control logic reads downstream of a present data set to determine whether a succeeding data set 75 comprises the superseding identifier with respect to the present data set 60, and, if the superseding identifier is determined to comprise the succeeding data set 75, logically denotes the logically invalidated (part of) present data set and reads the succeeding data set, for example, by decompressing the data of the data set, comprising transaction files 41 and 92.

In the example of FIG. 3, the accumulation is depicted as continuing, as are the two filemarks to mark the temporary end of the data. For example, in data set 75, the data file 92 is followed by a first filemark 102 and a second filemark 107. In data set 110, data file 41, filemark 42, data file 92 and filemark 102 of data set 75 are accumulated with a part 111 of the next data file transaction, and the second filemark 107 of data set 75 is logically deleted by the part 111 of the next data set 110. Data set 110 therefore sets the superseding identifier so as to supersede data set 75. The remainder 112 of the next data file transaction is overflowed into a new data set 120. Data set 120 does not supersede any part of data set 110 and therefore is not provided with a superseding identifier. The accumulation may continue as depicted in FIG. 3.

In one embodiment, the data sets which are not superseded are recursively rewritten as correct, and as accommodating the backspace commands. In the example of the copending '101 application, the accumulated data sets may be recursively rewritten, for example to the standard wraps of the magnetic tape, as data sets 130, 140 and 150. When recursively rewritten, no superseding identifier is employed, since the data sets are all correctly completed, and a command complete is issued, for example, for the transactions of the data sets.

FIG. 5 illustrates one example of a superseding identifier 91, also employing the same identifiers as employed for accumulation of the copending '101 application, as discussed above, and, if any data set is repeated in the succeeding data set having the identifier, the preceding data set is logically invalidated. Specifically, referring to FIGS. 3 and 5, for each data set, e.g. data sets 60, 75, the data set identifier 151 is incremented, while the write pass identifier 152 is maintained the same. Superseding identifier 153 of data set information table 90 of data set 75 is set in order to logically invalidate data set 60. In turn, superseding identifier 154 of data set information table 155 of data set 110 is set to logically invalidate data set 75. However, since data set 110 is valid, potential superseding identifier 156 of table 157 of data set 120 is not set. During a recovery process, the control logic previews the succeeding data set for the identifier and if set, logically denotes the preceding data set as invalidated.

The recursively rewritten data sets 130, 140 and 150 may have the same format, but as recursively rewritten data sets, they are complete and will not be logically invalidated.

Thus, as discussed above, the data sets that contain transactions that are subject to a backspace command to a point of a first transaction, followed by a command for overwriting at least a part of the first transaction are logically deleted by a superseding identifier in a succeeding data set. Additionally, a data set that is written to magnetic tape, but whose transactions are accumulated with subsequent transactions in a succeeding data set, with or without overwriting, may also be logically deleted by a superseding identifier in the succeeding data set. The logical deletion is as discussed above, only the trigger is different.

Other situations than a backspace or accumulation may arise where data is to be initially preserved, but subsequently is found to be undersireable, employing a still different trigger for logical deletion in accordance with the present invention. One example is to extend a maximum write skipping threshold without format violations when data underruns occur.

FIG. 6 illustrates another example of a superseding identifier in which the data set identifier 151 is incremented for each succeeding data set, but the data set identifier for the standard wraps 94 is selecteively incremented as a way of comprising a superseding identifier that is set. The data set identifier 94 is incremented to indiciate that the preceding data set is valid. Thus, referring additionally to FIG. 3, data set identifier 253 of data set information table 90 of data set 75 is not incremented, thereby logically invalidating preceding data set 60. Then, data set identifier 254 of data set information table 155 of data set 110 is also not incremented, logically invalidating preceding data set 75. Data set identifier 256 of table 157 of data set 120 is incremented, therby indicating that data set 110 is valid.

Figure 7:
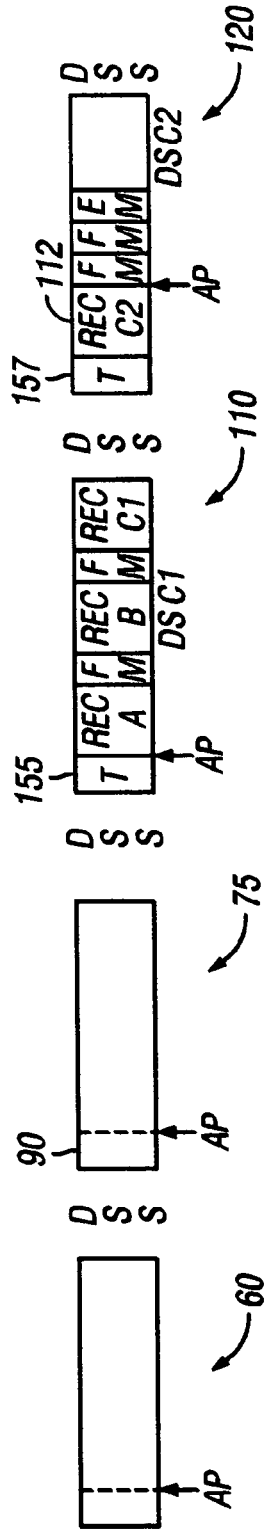
FIG. 7 is a diagrammatic illustration of some work copy data sets of FIG. 3 as read, some of which are logically invalidated.

FIG. 7 illustrates reading data sets 60, 75, 110 and 120 of FIG. 3, for example, for the purpose of data recovery. The superseding identifiers may comprise identifiers 91 of FIG. 5 or identifiers 94, 151 of FIG. 6. In FIG. 7, the superseding identifier of data set information table 90 of data set 75 logically invalidates data set 60. Thus, after reading the data set information table 90 downstream of data set 60, control logic logically denotes the logical invalidation and does not read (decompress) data of data set 60. The same holds true for the superseding identifier of data set information table 155 of data set 110, which causes the control logic to logically denote the logical invalidation of data set 75.

The potential superseding identifier of data set information table 157 of data set 120 is not set, thereby indicating that data set 110 is valid. Hence, the control logic reads and decompresses the contents of data set 110.

Figure 8:
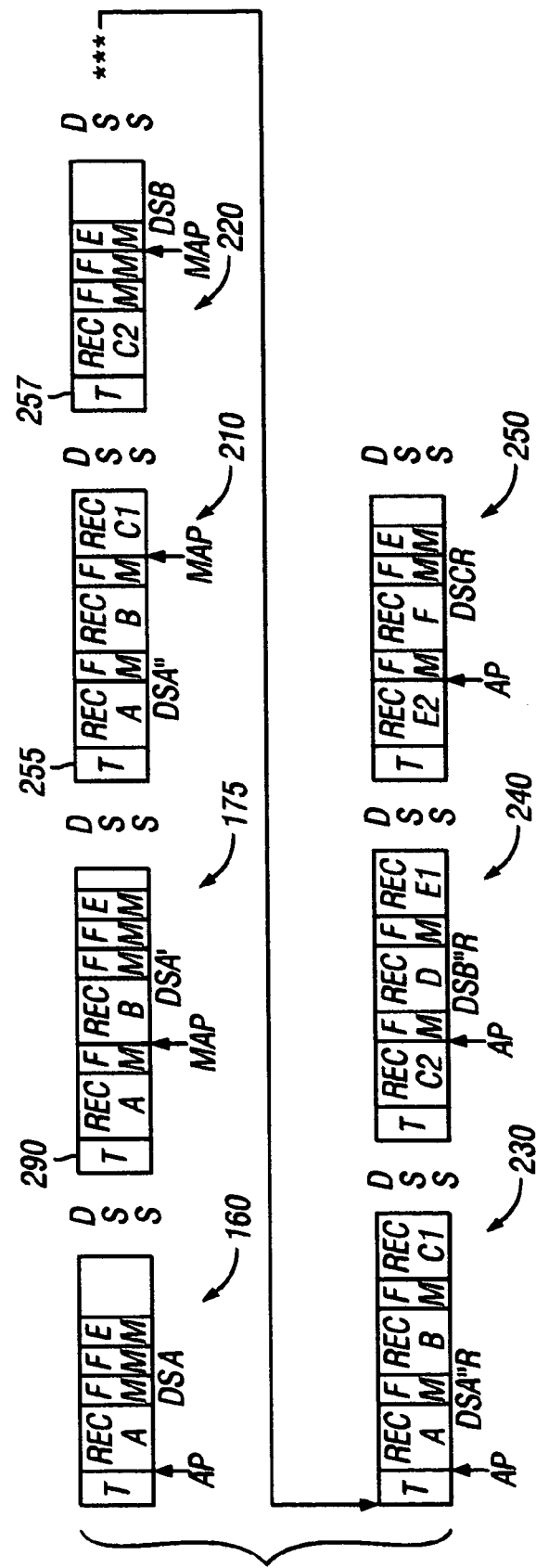
FIG. 8 is a diagrammatic illustration of data sets written on magnetic tape having a plurality of wraps, similar to FIG. 3, in accordance with another embodiment of the present invention employing incremented write pass indentifiers.

FIGS. 8 and 9 depict an alternate embodiment of a superseding identifier in which the write pass identifiers 252 are incremented for the data sets and the data set identifiers 251 are selectively incremented or unchanged to indicate validity or to comprise a superseding identifier logically invalidating the preceding data set.

In the example of FIGS. 8 and 9, data set identifier 353 of data set information table 290 of data set 175 is not incremented, thereby logically invalidating preceding data set 160. Then data set identifier 354 of data set information table 255 of data set 210 is also not incremented, logically invalidating preceding data set 175. Data set identifier 356 of data set information table 257 of data set 220 is incremented, thereby indicating that data set 210 is valid.

FIG. 10 illustrates the use of the superseding identifiers of FIG. 9, for example, for the purpose of data recovery. The non-incremented data set identifier 353 of data set information table 290 of data set 175 logically invalidates data set 160. Thus, after reading the data set information table 290 downstream of data set 60, control logic logically denotes the logical invalidation and does not read (decompress) data of data set 160. The same holds true for the superseding identifier, comprising the non-incremented data set identifier 354, of data set information table 255 of data set 210, which causes the control logic to logically denote the logical invalidation of data set 175.

The potential superseding identifier, comprising data set identifier 356, of data set information table 257 of data set 220, is incremented, such that the superseding identifier is not set, thereby indicating that data set 210 is valid. Hence, the control logic reads and decompresses the contents of data set 210.

Alternative arrangements of superseding identifiers may employ elements of the data set information table. For example, referring to FIG. 4, the write pass identifier 82 may be selectively incremented, while the data set identifier 81, 94 is incremented. Also, the moving access point may be selectively set to a superseding indicator value.

Figure 11:
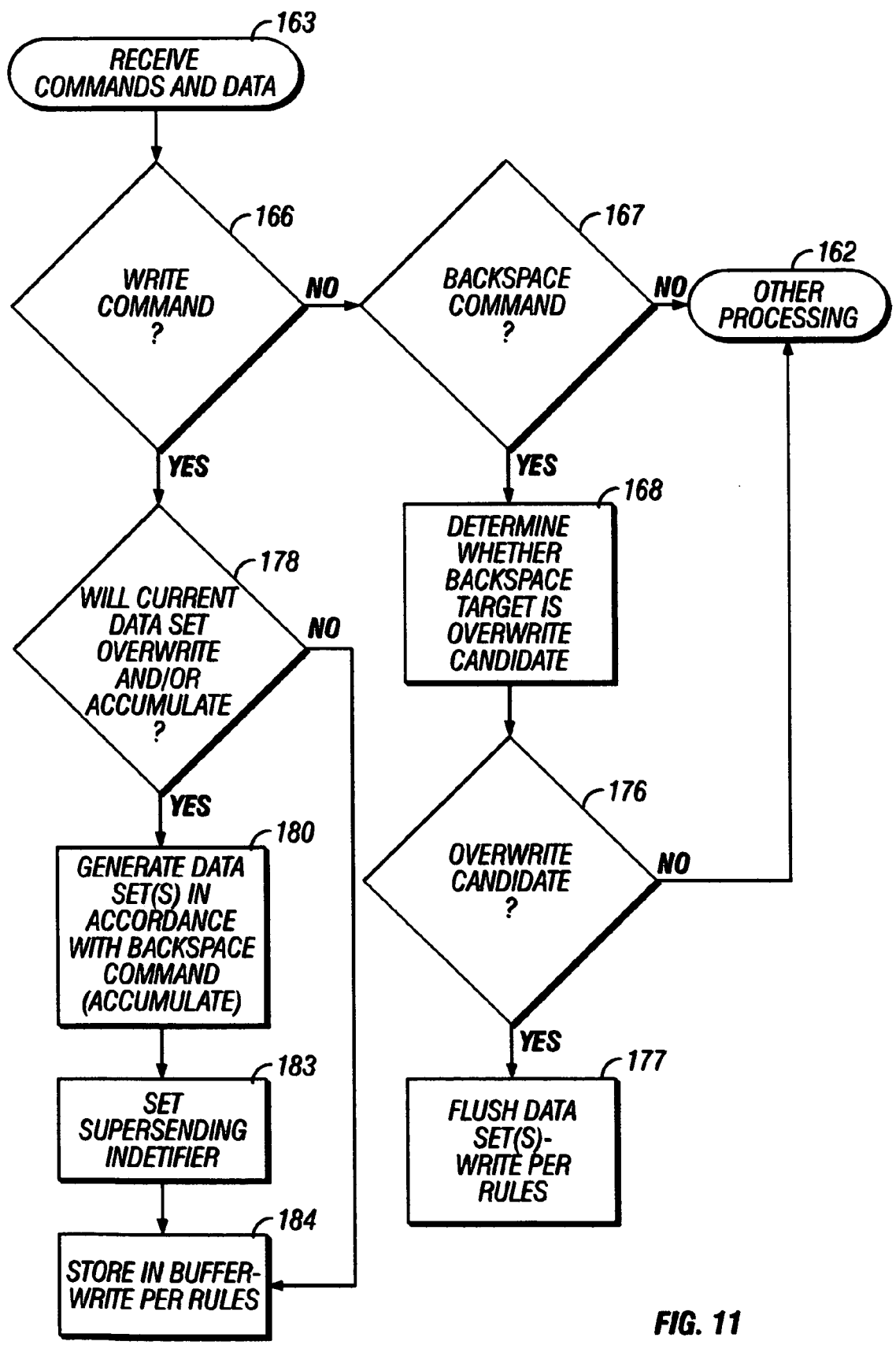
FIG. 11 is a flow chart depicting an embodiment of the method of the present invention for backhitchless writing of data having backspace and overwrite commands.

Referring to FIGS. 1 and 11, a method in accordance with an embodiment of the present invention is initiated at step 163, where the magnetic tape drive 10 receives commands and data at interface 21 for writing data transactions to magnetic tape 14. In the method, writing transactions per se follow a normal write process, and a backspace command followed by an overwrite command causes a rewrite of at least the overwritten part of a preceding data set in a succeeding data set together with setting a superseding identifier in the succeeding data set. Additionally or alternatively, when accumulating synchronized transactions on ABF wraps, a superseding identifier is set in a succeeding data set to logically invalidate a preceding data set that is accumulated into the succeeding data set.

In the example of FIGS. 1 and 11, in step 166, the control logic of controller 18 determines whether the command is a write command. If not, step 167 comprises a determination whether the command is a backspace command. If not, for example, the command is a read, other processing is conducted in step 162.

If step 167 indicates that the command is a backspace, the following command may or may not be a command causing overwrite. If it will be an overwrite, then, it will be necessary to first flush the data sets currently in the buffer 30 in order to preserve those data sets. If allowed by the host interface command specifications, one alternative is to hold the backspace command until the next command(s) is received to then determine whether a command is received that will cause an overwrite, and then flush the data sets. For example, a following command may only cause a read of the data set(s).

Another alternative is to immediately flush the data sets in response to a backspace command. This would comprise going directly to step 177 from step 167.

Still another alternative comprises step 168 to determine whether the backspace target is an overwrite candidate. For example, the backspace target may be to a position still downstream of any data set, such that the backspace target is not an overwrite candidate. In that case, step 176 proceeds to step 162 for other processing.

If the backspace target is an overwrite candidate, step 176 leads to step 177, and the control logic flushes the data sets from the buffer 30 to preserve the data sets(s) by writing to magnetic tape 14 per the normal rules. If the transactions are synchronized as per the copending '101 application, the accumulated data sets are flushed to the ABF wraps as per the rules of the application.

In step 166, receipt of a write command leads to step 178. Step 178 comprises optionally either or both of two decisions. One decision comprises whether the transaction will overwrite all or part of a previous transaction(s). If so, the current data set will comprise an overwrite of a preceding data set. In the context of the copending '101 application, the other decision comprises whether the current data set accumulates transaction(s) from a preceding data set for the ABF wraps.

If either or both decisions of step 178 are true, step 180 generates the current succeeding data set(s) in accordance with the backspace and overwrite commands, and/or the accumulation process, and step 183 sets the superseding identifier, so that the succeeding data sets(s) is identified as a superseding data set(s). In step 184, the generated superseding data set(s) is stored in buffer 30 and written per the rules of the application. If step 178 determines that no overwriting will occur, and that no accumulation will occur, the process proceeds directly to step 184 to write the transaction, again per the rules of the application.

Referring additionally to FIG. 3, the data transaction represented by data set 60 in FIG. 3 does not comprise a backspace command and is not an accumulation, and is initially handled by steps 178 and 184 to form a first data set 60 in buffer 30. The data set is written to magnetic tape in step 184, as at least one part of at least one data set 60 in accordance with the rules of the application. In the example of the copending '101 application data set 60 is written as a work copy on accumulated backhitchless flush (ABF) tracks. If no ABF tracks are provided, the data set may be written on the main tracks and are later recursively overwritten when a string of transactions are completed as work copies. This preserves the original transaction, also called the first transaction. A backspace command, for example, to delete or overwrite the second filemark 47 causes the control logic, in step 180, to logically accommodate the backspace command by generating at least one superseding data set 75 with the one transaction rewritten as adjusted in accordance with the backspace command, and, in step 183, logically invalidate at least one part of the one data set(s) 60 by setting a superseding identifier in the superseding data set(s) 75. In step 184, the superseding data set 75 with the first transaction adjusted in accordance with the backspace command is written to magnetic tape downstream from the one data set(s) 60. In the example, the control logic in step 180 changes the data set 60 to accommodate the backspace command, rewrites the transaction as changed by overwriting the second filemark 47 in data set 75 with data file 92, and, in step 183, sets the superseding identifier in the superseding data set 75. The superseding data set is written to magnetic tape 14 in step 184.

The transactions may also be accumulated and stored as work copies as pointed out by the copending '101 application, and step 183 sets the superseding identifier so that the accumulated data set(s) 75 logically invalidate the superseded data set (60).

Ultimately, the final accumulated data sets of the copending '101 application, are recursively rewritten as correct, and/or as accommodating the backspace commands. In the example of the copending '101 application, the accumulated data sets may be recursively rewritten, for example to the standard wraps of the magnetic tape, as data sets 130, 140 and 150.

When recursively rewritten, no superseding identifier is employed, since the data sets are all correctly completed.

Figure 12:
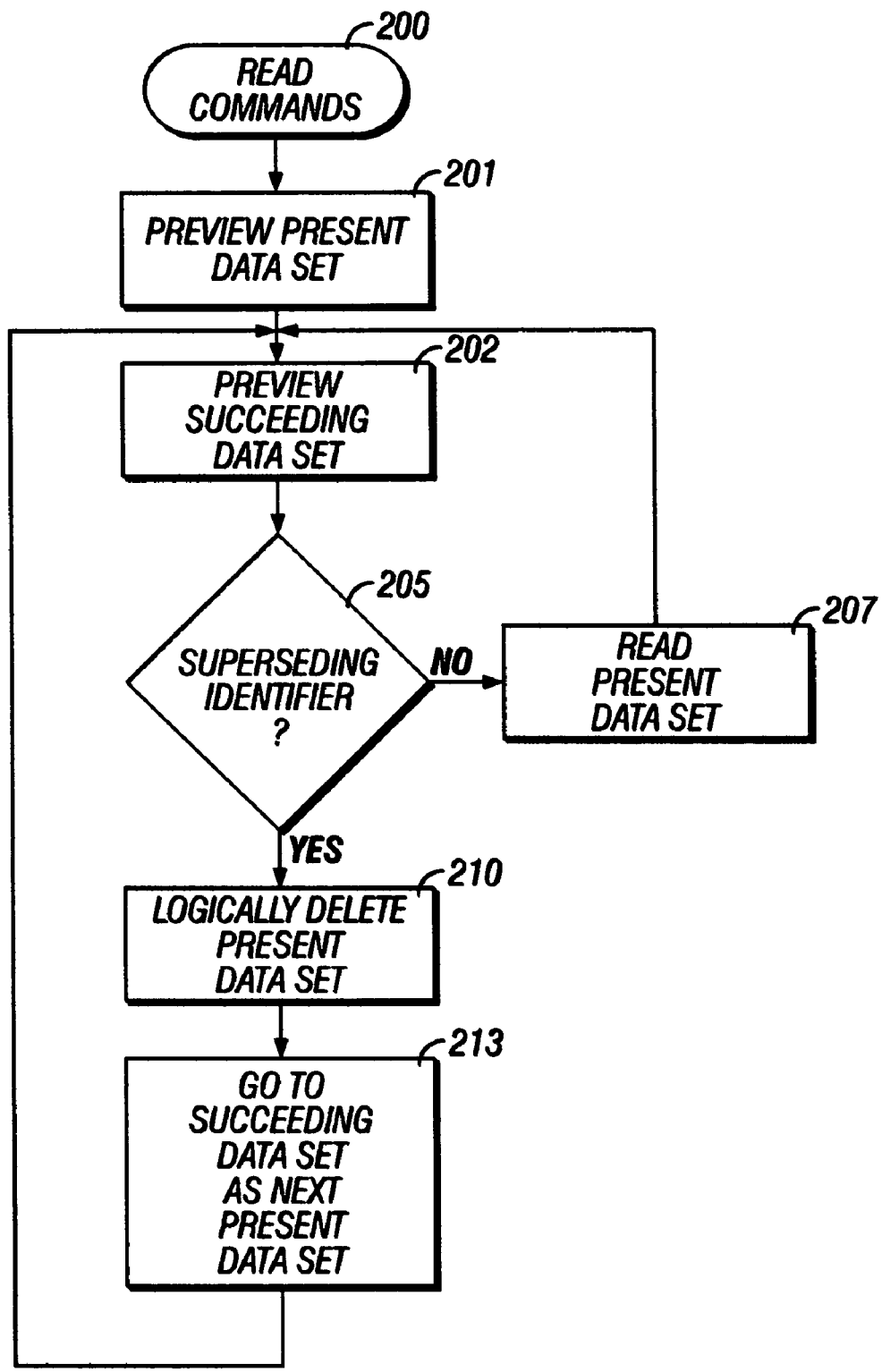
FIG. 12 is a flow chart depicting an embodiment of the method of the present invention for reading data, some of which has been logically invalidated.

Referring to FIGS. 1, 3 and 12, in the event recovery is required before the changed data set can be written in the desired position on the magnetic tape, such as on the standard wraps, beginning at step 200, the control logic of controller 18 operates the magnetic tape drive to read transactions from magnetic tape 14 by, in step 201, previewing a present data set 60 by reading the data set but not decompressing the data, and, in step 202, reading downstream of a present data set 60 to preview at least one succeeding data set to determine, in step 205, whether a succeeding data set, such as data set 75, comprises the superseding identifier with respect to the present data set, e.g. in data set table 95.

If there is no succeeding data set with a superseding identifier with respect to the present data set, in step 207, the control logic of controller 18 operates the magnetic tape drive to read the present data set, e.g. decompressing the compressed data. The process cycles to step 202 for the next data set.

If the superseding identifier is determined to comprise the succeeding data set, the control logic, in step 210, logically deletes the logically invalidated (part of) present data set and, in step 213, goes to the succeeding data set, which may also comprise the superseding data set, as the next present data set, and cycles to step 202. For example, the data set 75 has overwritten the second filemark 47 of data set 60 with a new transaction comprising file 92. Since the superseding identifier has been set in data set 75, indicating that the data set 60 is logically invalidated, the control logic logically deletes and does not decompress the contents of data set 60, as otherwise would occur at the access point 96. In the example of FIG. 3, the succeeding data set 75 is also the subject of further accumulation and is itself superseded by the superseding identifier of succeeding data set 110. Hence, steps 202, 205, 210 and 213 are repeated for the next present data set 75 and succeeding data set 110. In the following cycle, step 202 previews at least succeeding data set 120 and indicates that there is no superseding identifier with respect to present data set 110. Thus, since data set 110 is not superseded, in step 207, the content of the present data set 110 is decompressed beginning at access point 217, established as the result of the logical invalidation of data sets 60 and 75.

The illustrated components of the magnetic tape drive 10 of FIG. 1 may be varied, combined, or combined functions may be separated, and the arrangement of the data formats of FIG. 3 and data set table 80 on FIG. 4 may be varied, or altered, added to or deleted, as is known to those of skill in the art. The illustrated steps of FIGS. 11 and 12 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing form the scope of the present invention as set forth in the following claims.

What is claimed is:

1. A recording system control for a magnetic tape drive, said magnetic tape drive having at least one motor for moving a magnetic tape longitudinally, having at least one read/write head for reading from and for writing to said magnetic tape while said magnetic tape is moved longitudinally by said at least one motor, having at least one recording channel for writing data to magnetic tape; said recording system control comprising:
    at least one buffer for storing data to be written to magnetic tape; and
    control logic operating said at least one buffer and said at least one recording channel, said control logic writing data stored in said at least one buffer to magnetic tape in the form of data sets; and, in response to a trigger, writes at least one succeeding data set downstream from at least one preceding data set, and logically invalidates at least a part of said at least one preceding data set by setting a superseding identifier in said at least one succeeding data set.

2. The recording system control of claim 1, wherein said superseding identifier comprises a data set identifier selectively arranged indicate that said at least one succeeding data set logically invalidates said at least one preceding data set.

3. The recording system control of Claim 1, wherein said control logic additionally reads data by reading downstream of a present said data set to determine whether a succeeding data set comprises said superseding identifier with respect to said present data set and, if said superseding identifier is determined to be comprised in said succeeding data set, logically denoting said logically invalidated at least one part of said present data set.

4. A recording system control for a magnetic tape drive, said magnetic tape drive having at least one motor for moving a magnetic tape longitudinally, having at least one read/write head for reading from and for writing to said magnetic tape while said magnetic tape is moved longitudinally by said at least one motor, having at least one recording channel for writing data to magnetic tape; said recording system control comprising:
    at least one buffer for storing data to be written to magnetic tape; and
    control logic operating said at least one buffer and said at least one recording channel, said control logic writing data from said at least one buffer to magnetic tape in response to received commands; said control logic arranging data stored in said at least one buffer in the form of transactions into at least one data set for writing to magnetic tape; and if a backspace command is received to backspace to a point of a first transaction, and is followed by a command for overwriting at least a part of said first transaction, said control logic rewrites said first transaction adjusted in accordance with said backspace and overwrite commands to magnetic tape as at least one superseding data set downstream from at least one preceding data set having said first transaction, and logically invalidates at least one preceding part of said at least one preceding data set by setting a superseding identifier in said at least one superseding data set.

5. The recording system control of claim 4, wherein said superseding identifier comprises a data set identifier selectively arranged to indicate that said at least one superseding data set logically invalidates said at least one preceding data set.

6. The recording system control of claim 4, wherein said superseding identifier comprises a write pass identifier incremented with respect to said at least preceding one data set together with a selectively adjusted data set identifier.

7. The recording system control of claim 4, wherein said superseding identifier comprises an identifier together with an indication that said superseding data set comprises said one transaction.

8. The recording system control of claim 4, wherein said superseding identifier comprises an identifier together with a repetition of at least part of said one transaction as said superseding data set.

9. The recording system control of claim 4, wherein said control logic additionally reads transactions by reading downstream of a present said data set to determine whether a succeeding data set comprises said superseding identifier with respect to said present data set, and, if said superseding identifier is determined to be comprised in said succeeding data set, logically denoting said logically invalidated at least one part of said present data set and reading said superseding data set.

10. A recording system control for a magnetic tape drive, said magnetic tape drive having at least one motor for moving a magnetic tape longitudinally, having at least one read/write head for reading from and for writing to said magnetic tape while said magnetic tape is moved longitudinally by said at least one motor, and having at least one recording channel for operating said at least one read/write head for writing data to magnetic tape; said recording system control comprising:
    at least one buffer for storing data to be written to magnetic tape; and
    control logic operating said at least one buffer and said at least one recording channel, said control logic writing data from said at least one buffer to magnetic tape; said control logic:
    arranging data stored in said at least one buffer in the form of transactions into at least one preceding data set for writing to magnetic tape; and if at least one first transaction arranged to be written to magnetic tape comprises less than an entire preceding data set and is followed by another transaction associated with said first transaction, accumulating said at least one first transaction with said another transaction and writing the accumulated transaction to magnetic tape as at least one superseding data set downstream from said at least one data set, logically invalidating at least one part of said at least one data set by setting a superseding identifier in said superseding data set.

11. The recording system control of Claim 10, wherein said control logic additionally:

reads said data sets, reading downstream of a present said data set to determine whether a succeeding data set comprises said superseding identifier with respect to said present data set, and, is said superseding identifier is determined to be comprised in said succeeding data set, logically denoting said logically invalidated at least one part of said present data set and reading said succeeding data set.

12. The recording system control of Claim 10, wherein said superseding identifier comprises a data set identifier selectively arranged to indicate that said at least one superseding data set logically invalidates said at least one preceding data set.

13. The recording system control of Claim 10, wherein said superseding identifier comprises a write pass identifier incremented with respect to said at least one preceding data set together with a selectively adjusted data set identifier.

14. A magnetic tape drive comprising:

at least one motor for moving a magnetic tape longitudinally;

at least one read/write head for reading from and for writing to said magnetic tape while said magnetic tape is moved longitudinally by said at least one motor;

at least one buffer for storing data to be written to magnetic tape;

at least one recording channel communicating with said at least one buffer for operating said at least one read/write head for writing data from said at least one buffer to magnetic tape; and control logic operating said at least one buffer and said at least one recording channel, said control logic writing data stored in said at least one buffer to magnetic tape in the form of data sets; and, in response to a trigger, writes at least one succeeding data set downstream from at least one preceding data set, and logically invalidates at least a part of said at least one preceding data set by setting a superseding identifier in said at least one succeeding data set.

15. The magnetic tape drive of claim 14, wherein said superseding identifier comprises a data set identifier selectively arranged indicate that said at least one succeeding data set logically invalidates said at least one preceding data set.

16. The magnetic tape drive of Claim 14, wherein said control logic additionally reads data by reading downstream of a present said data set to determine whether a succeeding data set comprises said superseding identifier with respect to said present data set, and, if said superseding identifier is determined to be comprised in said succeeding data set, logically denoting said logically invalidated at least on part of said present data set.

17. A magnetic tape drive comprising:

at least one motor for moving a magnetic tape longitudinally;

at least one read/write head for reading from and for writing to said magnetic tape while said magnetic tape is moved longitudinally by said at least one motor;

at least one buffer for storing data to be written to magnetic tape;

at least one recording channel communicating with said at least one buffer for operating said at least one read/write head for writing data from said at least one buffer to magnetic tape;

at least one interface for receiving commands regarding data to be written to magnetic tape; and control logic operating said at least one buffer and said at least one recording channel, said control logic writing data from said at least one buffer to magnetic tape in response to commands received at said at least one interface; said control logic arranging data stored in said at least one buffer in the form of transactions into at least one data set for writing to magnetic tape; and if a backspace command is received at said at least one interface to backspace to a point of a first transaction, and is followed by a command for overwriting at least a part of said first transaction, said control logic writes said first transaction to magnetic tape as at least one part of at least one preceding data set, and rewrites said first transaction adjusted in accordance with said backspace and overwrite commands to magnetic tape as at least one superseding data set downstream from said at least one preceding data set, and logically invalidates at least one part of said at least one preceding data set by setting a superseding identifier in said at least one superseding data set.

18. The magnetic tape drive of claim 17, wherein said superseding identifier comprises a data set identifier selectively arranged to indicate that said at least one superseding data set logically invalidates said at least one preceding data set.

19. The magnetic tape drive of claim 17, wherein said superseding identifier comprises a write pass identifier incremented with respect to said at least one preceding data set together with a selectively adjusted data set identifier.

20. The magnetic tape drive of claim 17, wherein said superseding identifier comprises an identifier together with an indication that said superseding data set comprises said one transaction.

21. The magnetic tape drive of claim 17, wherein said superseding identifier comprises an identifier together with a repetition of at least part of said one transaction as said superseding data set.

22. The magnetic tape drive of claim 17, wherein said control logic reads transactions by reading downstream of a present said data set to determine whether a succeeding data set comprises said superseding identifier with respect to said present data set, and, if said superseding identifier is determined to be comprised in said succeeding data set, logically denoting said logically invalidated at least one part of said present data set and reading said superseding data set.

23. A magnetic tape drive comprising:

at least one motor for moving a magnetic tape longitudinally;

at least one read/write head for reading from and for writing to said magnetic tape while said magnetic tape is moved longitudinally by said at least one motor;

at least one buffer for storing data to be written to magnetic tape;

at least one recording channel communicating with said at least one buffer for operating said at least one read/write head for writing data from said at least one buffer to magnetic tape; and control logic operating said at least one buffer and said at least one recording channel, said control logic writing data from said at least one buffer to magnetic tape; said control logic:

arranging data stored in said at least one buffer in the form of transactions into at least one preceding data set for writing to magnetic tape; and if at least one first transaction arranged to be written to magnetic tape comprises less than an entire preceding data set and is followed by another transaction associated with said first transaction, accumulating said at least one first transaction with said another transaction and writing the accumulated transaction to magnetic tape as at least one superseding data set downstream from said at least one data set, logically invalidating at least one part of said at least one data set by setting a superseding identifier in said superseding data set.

24. The magnetic tape drive of Claim 23, wherein said control logic additionally:

reads said data sets, reading downstream of a present said data set to determine whether a succeeding data set comprises said superseding identifier with respect to said present data set, and, if said superseding identifier is determined to be comprised in said succeeding data set, logically denoting said logically invalidated as least one part of said present data set and reading said succeeding data set.

25. The magnetic tape drive of Claim 23, wherein said superseding identifier comprises a data set identifier selectively arranged to indicate that said at least one superseding data set logically invalidates said at least one preceding data set.

26. The magnetic tape drive of Claim 23, wherein said superseding identifier comprises a write pass identifier incremented with respect to said at least one preceding data set together with a selectively adjusted data set identifier.

27. A method for writing data to magnetic tape, in a magnetic tape drive comprising at least one motor for moving a magnetic tape longitudinally; at least one read/write head for reading from and for writing to said magnetic tape while said magnetic tape is moved longitudinally by said at least one motor; at least one buffer for storing data to be written to magnetic tape; and at least one recording channel communicating with said at least one buffer for operating said at least one read/write head for writing data from said at least one buffer to magnetic tape; said method comprising the steps of:

operating said at least one buffer and said at least one recording channel to write data stored in said at least one buffer to magnetic tape in the form of data sets; and in response to a trigger, operating said at least one buffer and said at least one recording channel to write at least one data set downstream from at least one preceding data set, and logically invalidate at least a part of said at least one preceding data set by setting a superseding identifier in said at least one succeeding data set.

28. The method of claim 27, wherein said superseding identifier comprises a data set identifier selectively arranged to indicate that said at least one superseding data set logically invalidates said at least one preceding data set.

29. The method of Claim 27, additionally comprising the step of reading data by reading downstream of a present said data set to determine whether a succeeding data set comprises said superseding identifier with respect to said present data set, and, if said superseding identifier is determined to be comprised in said succeeding data set, logically denoting said logically invalidated at least part of said present data set.

30. A method for writing data to magnetic tape, in a magnetic tape drive comprising at least one motor for moving a magnetic tape longitudinally; at least one read/write head for reading from and for writing to said magnetic tape while said magnetic tape is moved longitudinally by said at least one motor; at least one buffer for storing data to be written to magnetic tape; and at least one recording channel communicating with said at least one buffer for operating said at least one read/write head for writing data from said at least one buffer to magnetic tape; said method comprising the steps of:

arranging data stored in said at least one buffer in the form of transactions into at least one data set for writing to magnetic tape; and if a backspace command is received to backspace to a point of a first transaction, and is followed by a command for overwriting at least a part of said first transaction, operating said at least one buffer and said at least one recording channel to rewrite said first transaction adjusted in accordance with said backspace and overwrite commands to magnetic tape as at least one superseding data set downstream from at least one preceding data set having said first transaction, and logically invalidate at least one part of said at least one preceding data set by setting a superseding identifier in said at least one superseding data set.

31. The method of claim 30, wherein said superseding identifier comprises a data set identifier selectively arranged to indicate that said at least one superseding data set logically invalidates said at least one preceding data set.

32. The method of Claim 30, wherein said superseding identifier comprises a write pass identifier incremented with respect to said at least one preceding data set together with a selectively adjusted data set identifier.

33. The method of Claim 30, wherein said superseding identifier comprises an identifier together with an indication that said superseding data set comprises said one transaction.

34. The method of Claim 30, wherein said superseding identifier comprises an identifier together with a repetition of at least part of said one transaction as said superseding data set.

35. The method of Claim 30, additionally comprising the step of reading transactions by reading downstream of a present said data set to determine whether a succeeding data set comprises said superseding identifier with respect to said present data set, and, if said superseding identifier is determined to be comprised in said succeeding data set, logically denoting said logically invalidated at least one part of said present data set and reading said superseding data set.

36. A method for writing data to magnetic tape, in a magnetic tape drive comprising at least one motor for moving a magnetic tape longitudinally; at least one read/write head for reading from and for writing to said magnetic tape while said magnetic tape is moved longitudinally by said at least one motor; at least one buffer for storing data to be written to magnetic tape; at least one recording channel communicating with said at least one buffer for operating said at least one read/write head for writing data from said at least one buffer to magnetic tape; said method comprising the steps of:

arranging data stored in said at least one buffer in the form of transactions into at least one preceding data set for writing to magnetic tape; and if at least one first transaction arranged to be written to magnetic tape comprises less than an entire preceding data set and is followed by another transaction associated with said first transaction, accumulating said at least one first transaction with said another transaction and writing the accumulated transaction to magnetic tape as at least one superseding data set downstream from said at least one data set, logically invalidating at least one part of said at least one data set by setting a superseding identifier in said superseding data set.

37. The method of claim 36, additionally comprising the step of:

reading said data sets, reading downstream of a present said data set to determine whether a succeeding data set comprises said superseding identifier with respect to said present data set, and, if said superseding identifier is determined to be comprised in said succeeding data set, logically denoting said logically invalidated at least one part of said present data set and recursively rewriting said succeeding data set.

38. The method of Claim 36, wherein said superseding identifier comprises a data set identifier selectively arranged to indicate that said at least one superseding data set logically invalidates said at least one preceding data set.

39. The method of Claim 36, wherein said superseding identifier comprises a write pass identifier incremented with respect to said at least one preceding data set together with a selectively adjusted data set identifier.

* * * * *